United States Patent
Gokaraju et al.

(10) Patent No.: US 8,572,162 B2
(45) Date of Patent: Oct. 29, 2013

(54) ADAPTIVE SCREEN PAINTING TO ENHANCE USER PERCEPTION DURING REMOTE MANAGEMENT SESSIONS

(75) Inventors: Ravi kiran Gokaraju, Hyderabad (IN); Vamsi Krishna, Bangalore (IN)

(73) Assignee: Novell, Inc., Provo, UT (US)

( * ) Notice: Subject to any disclaimer, the term of this patent is extended or adjusted under 35 U.S.C. 154(b) by 426 days.

(21) Appl. No.: 12/325,538

(22) Filed: Dec. 1, 2008

(65) Prior Publication Data
US 2010/0138476 A1 Jun. 3, 2010

(51) Int. Cl.
*G06F 15/16* (2006.01)
(52) U.S. Cl.
USPC .......................................... 709/203; 709/201
(58) Field of Classification Search
USPC .................................................. 709/203, 201
See application file for complete search history.

(56) References Cited

U.S. PATENT DOCUMENTS

| | | | |
|---|---|---|---|
| 6,571,245 B2 | 5/2003 | Chun et al. | |
| 6,970,145 B1 | 11/2005 | Aoki | |
| 7,113,169 B2 | 9/2006 | Gnanamgari et al. | |
| 7,127,745 B1 | 10/2006 | Hersee et al. | |
| 2002/0065949 A1 | 5/2002 | Heaton | |
| 2002/0156892 A1* | 10/2002 | Karger et al. | 709/225 |
| 2004/0103438 A1 | 5/2004 | Yan et al. | |
| 2004/0145605 A1 | 7/2004 | Basu et al. | |
| 2005/0081158 A1* | 4/2005 | Hwang | 715/740 |
| 2007/0214455 A1 | 9/2007 | Williams et al. | |
| 2008/0267589 A1* | 10/2008 | Turner et al. | 386/109 |

OTHER PUBLICATIONS

"Virtual Machine Management Guide/Novell (r) ZENworks(r) Orchestrator 1.3", (c) 2008 Novell, Inc., (Aug. 15, 2008), 117 pgs.
Richardson, T., "The RFB Protocol", (Version 3.8), (updated Aug. 28, 2008)), 43 pgs.
Richardson, T., et al., "Virtual Network Computing", *IEEE Internet Computing*, 2(1), (Jan./Feb. 1998), 33-38.

* cited by examiner

*Primary Examiner* — Dustin Nguyen
*Assistant Examiner* — Joel Mesa
(74) *Attorney, Agent, or Firm* — Schwegman, Lundberg & Woessner, P.A.

(57) ABSTRACT

Systems and methods are presented for screen painting updates on a client display to reflect changes in a remote server display. According to a method embodiment, an FBUR is sent from a virtual network computing (VNC) client through a network connection to the VNC server. The FBUR requests the VNC server to identify changes in a display of the VNC server. An FBU is received from the VNC server at the VNC client. The FBU identifies changes in the display of the VNC server. A screen painting algorithm implemented by the VNC client to update a display of the VNC client is dynamically modified based on a speed of the network connection. The display of the VNC client is updated using the screen painting algorithm.

20 Claims, 2 Drawing Sheets

ADAPTIVE SCREEN PAINTING TO ENHANCE USER PERCEPTION DURING REMOTE MANAGEMENT SESSIONS

FIELD

This disclosure relates generally to remote computer management, and more particularly to systems and methods for screen painting updates on a client display to reflect changes in a remote server display.

BACKGROUND

A Virtual Network Computing (VNC) system is a client/server software package that allows remote network access to graphical desktops. During a typical VNC session, an operator performs a remote management session and uses the remote desktop like his local desktop. The operator performs various graphical operations like reading a document, editing text, using a graphical user interface (GUI) application, and the like. The quality of service depends on the responsiveness of these operations.

A VNC system includes a client, a server, and a communication protocol. The VNC client, also referred to as a VNC Viewer, is interested in the graphical desktop of a remote machine, and periodically requests updates of the screen (Frame Buffer) of the server. The VNC client sends a request packet, referred to as a FrameBufferUpdateRequest (FBUR), to the server to request the update of the server.

The VNC server is a process running on the remote machine. The VNC server sends the updates of its screen as a response to receiving the FBUR from the VNC client. This response by the server sent to the client to update the screen changes is referred to as a FrameBufferUpdate (FBU). The FBU includes information regarding the changed portion of a screen. The changed portion of the screen is divided into various small rectangles, and the rectangles are encoded according to various encodings to optimize the amount of data transferred. The number of rectangles depends on type of encoding used. For example, hextile encoding splits the FBU into 16×16 rectangles, and tight encoding has one rectangle for background color and one rectangle has foreground, etc.). The rectangle represents the area of the screen that is effected, but the information in the rectangle depends on the encoding used to represent that rectangle.

The VNC protocol (e.g. remote framebuffer (RFB)) is a simple protocol for remote access to graphical user interfaces (GUIs). The VNC protocol is based on one graphic primitive from the server to the client ("Put a rectangle of pixel data at the specified X,Y position") and event messages from the client to the server.

In known VNC systems, the VNC client receives a FBU from the VNC server, and reads the total number of rectangles represented in the FBU. For each rectangle represented in the FBU, the VNC client reads the information for one of the rectangles, decodes the information, paints the decoded information for the rectangle on the screen, and then continues to read, decode and paint each one of the remaining rectangles in the FBU until all of the rectangles in the FBU have been processed. When all of the rectangles in the FBU have been processed, the VNC client sends a new FBUR to the VNC server.

SUMMARY

According to a method embodiment, an FBUR is sent from a virtual network computing (VNC) client through a network connection to the VNC server. The FBUR requests the VNC server to identify changes in a display of the VNC server. An FBU is received from the VNC server at the VNC client. The FBU identifies changes in the display of the VNC server. A screen painting algorithm implemented by the VNC client to update a display of the VNC client is dynamically modified based on a speed of the network connection. The display of the VNC client is updated using the screen painting algorithm.

This Summary is an overview of some of the teachings of the present application and not intended to be an exclusive or exhaustive treatment of the present subject matter. Further details about the present subject matter are found in the detailed description and appended claims. Other aspects will be apparent to persons skilled in the art upon reading and understanding the following detailed description and viewing the drawings that form a part thereof, each of which are not to be taken in a limiting sense. The scope of the present invention is defined by the appended claims and their equivalents.

DETAILED DESCRIPTION

Figure 1:
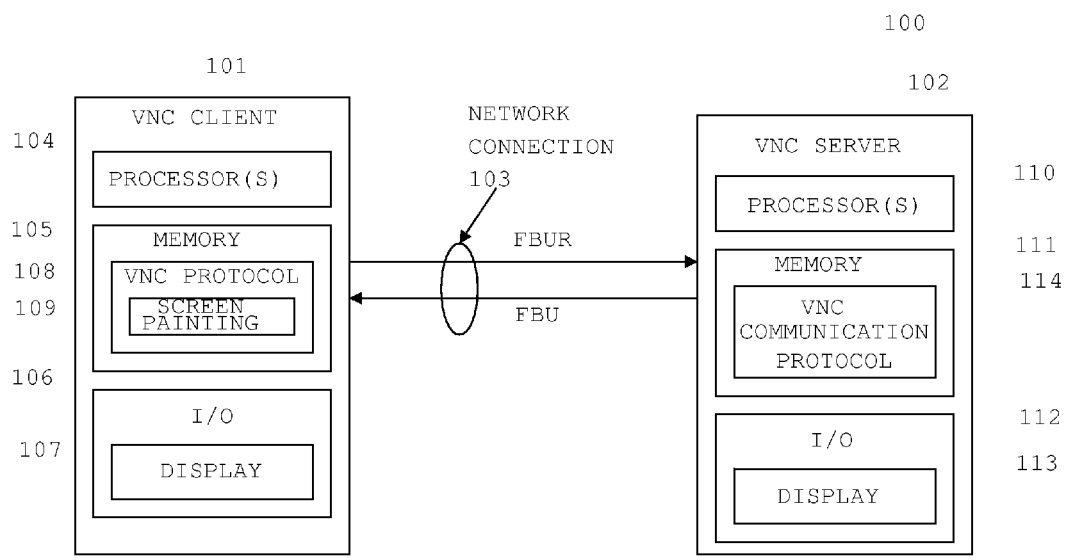
FIG. 1 illustrates an embodiment of a virtual network computing (VNC) system with adaptive screen painting.

Known VNC systems have problems. Each FBU contains multiple rectangles, usually tens and hundreds of them. The known VNC client paints each rectangle one at a time, such that the screen is painted as many times as the number of change rectangles in the FBU. As soon as the FBU is processed, the VNC client sends a fresh FBUR to the server. As a result, a VNC session on a fast network may process 40 FBUs in one second, such that the VNC session processes changes that are more than what a normal human eye can perceive. Known VNC systems do not account for different network speeds, which can cause the "responsiveness" of remote management sessions to be different. On a slow network, where a screen change may take approximately 2-3 seconds to get painted, the user requires faster changes in the screen to have a continuity in perception of the display. However, on a fast network, the number of screens painted per second will be as many as 30-40.

The perceived responsiveness of an operation, such as scrolling a web page, can be bad if the VNC is too quick in painting the screen updates. For example, if the number of screen updates sent by a VNC during a scroll operation is far more than what a human eye can perceive, then the perceived responsiveness will suffer. The present subject matter implements an algorithm that controls the number of screen updates during a remote management session without dropping important changes. The implementation of the algorithm enhances the user experience during a remote management session without reducing the speed for normal operation or dropping important changes during remote management sessions. The algorithm can be implemented even in VNC systems with slow network connections, and can reduce the use of network bandwidth. Various embodiments provide an adaptive algorithm, where the algorithm makes adjustments based on the network bandwidth of a VNC connection.

According to various embodiments, the VNC client detects the available bandwidth of the underlying network connection with the VNC server, and remembers the state of the network (i.e. fast or slow network). For example, a network connection having a speed greater than or equal to 512 kbps may be considered fast, and a network connection having a speed less than 512 kbps may be considered slow. In response to an FBUR from the VNC client, the VNC server sends a FBU reflecting an update or changes on the screen of the VNC server. The VNC client receives the FBU.

For fast networks (e.g. a network connection having a speed greater than or equal to 512 kbps), the VNC client reads the total number of rectangles in the FBU. For each rectangle, the client decodes the information and updates a memory buffer instead of painting the screen. Once the last rectangle of a FBU is processed, the client updates the screen using the memory buffer. This way the screen is actually painted once per FBU. The VNC client starts a timer (e.g. an 80 millisecond timer), and sends the next FBUR when the timer expires. The 80 millisecond timer results in painting the screen 12 to 13 times per second, which has been found in performance testing to be a desirable rate for painting the screen. The predetermined time of the timer can be adjusted for good performance on the network. By waiting for the timer to expire, the VNC client does not request more changes than what a normal eye can perceive. Reducing the number of FBURs sent by the VNC client reduces the number of FBUs sent by the VNC server, which reduces the usage of the network bandwidth and reduces the processing time on both the client and the server.

For slow networks (e.g. a network connection having a speed less than 512 kbps), the client reads each change (e.g. rectangle) from the FBU and directly paints the information to the screen. By directly painting the screen as each change is processed on a slow network, the user will perceive that something is happening on the screen rather than waiting (e.g. 2-3 seconds) for the whole screen to be painted. The VNC client sends a FBUR to the VNC server as soon as the last rectangle is processed.

A counter counts the number of processed FBURs. Once the count reaches a predetermined value (e.g. 100 processed framebuffer update requests), the VNC client re-computes the network speed. Thus, the present subject matter provides a dynamically-adaptable painting algorithm based on the speed of the underlying network. By providing a client-controlled algorithm for requesting screen changes, the server does not send the frame buffer updates while the client user cannot perceive them which decreases the bandwidth used on the network by dropping unnecessary changes. On a fast network, changes that are grouped logically makes more sense than changes that are continuous and fast. This algorithm ensures that all the changes are grouped into one single logical painting operation giving a smooth perception to the end user. Together with the caching algorithm and other performance improvements done in VNC, this algorithm will give better viewing experience during a remote management session.

The present subject matter can be extended to any image processing network application (like browsers) where the speed of the underlying network can be used as a trigger in changing the end user perception of the overall painting.

FIG. 1 illustrates an embodiment of a virtual network computing (VNC) system with adaptive screen painting. The illustrated VNC system 100 includes a VNC client 101 and a VNC server 102. The client 101 and server 102 are adapted to communicate over a network connection 103.

The illustrated client 101 includes at least one processor 104, a memory 105, and input /output (I/O) devices 106. One of the I/O devices is a display 107. As is understood by those of ordinary skill in the art, the memory 105 includes sets of instructions capable of being operated on by the processor(s) and directing the processor(s) to perform various processes, including but not limited to processes that enable the VNC server 102 to be remotely managed using the client 101, and processes to display images on the display 107. The memory 105 can also be used to store data, such as the detected speed of the network connection. In the illustrated embodiment of the VNC client 101, the memory 105 includes a set of instructions capable of being operated on by the processor(s) to control a VNC protocol 108 for the client 101. The illustrated VNC protocol includes an adapted screen painting process 109 used to update the display 107 to reflect changes in the display of the server.

The illustrated server 102 includes at least one processor 110, a memory 111, and input /output (I/O) devices 112. One of the I/O devices of the server is a display 113. As is understood by those of ordinary skill in the art, the memory 111, which may include one or more instances of memory, includes sets of instructions capable of being operated on by the processor(s) and directing the processor(s) to perform various processes, including but not limited to processes that enable the VNC server 102 to be remotely managed using the client 101, and processes to display images on the display 113. The illustrated processor(s) is intended to encompass a single processor, as well as multi-core processors and distributed processing systems. The memory 111 can also be used to store data, such as the detected speed of the network connection. In the illustrated embodiment of the VNC server 102, the memory 111 includes a set of instructions capable of being operated on by the processor(s) to control a VNC communication protocol 114 for the server 102.

The VNC protocol, as reflected by the instructions 108 for the client 101 and the instructions 114 for the server 102, is used to enable the remote management of the server 102 using the client 101 and the network connection 103 between the client and server. VNC protocol instructions 108 are used by the client to send FBURs to the server through the network connection, and VNC protocol instructions 114 are used by the server to track changes in the display 113, receive FBURs from the client, and respond to each FBUR from the client by sending an FBU to the client.

Figure 2:
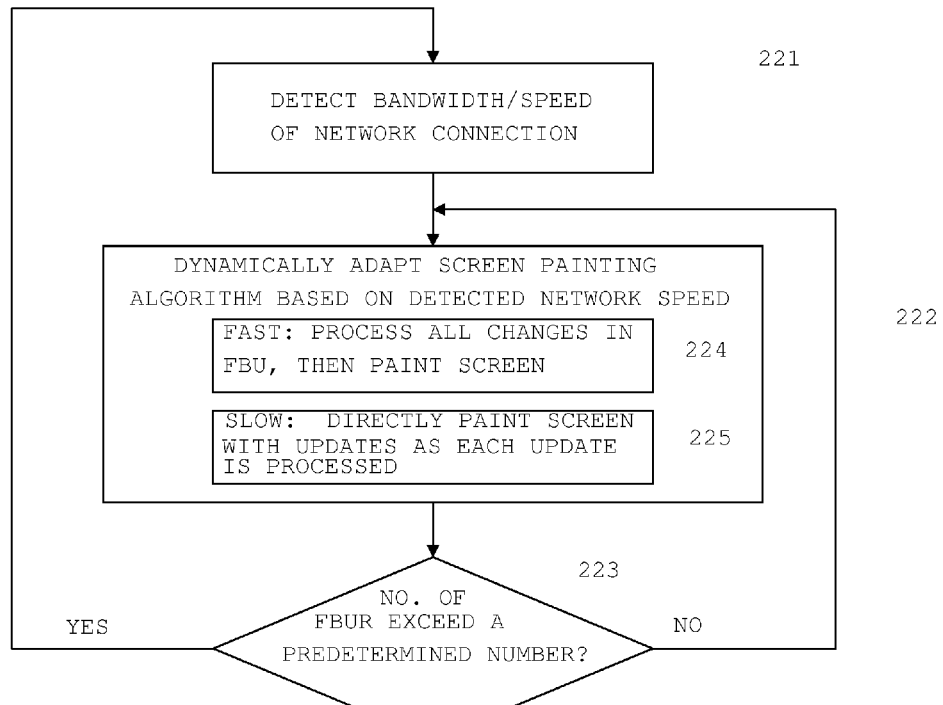
FIGS. 2-3 illustrate method embodiments performed by the VNC system to paint the screen of the client to reflect changes in the screen of the server.
Figure 3:
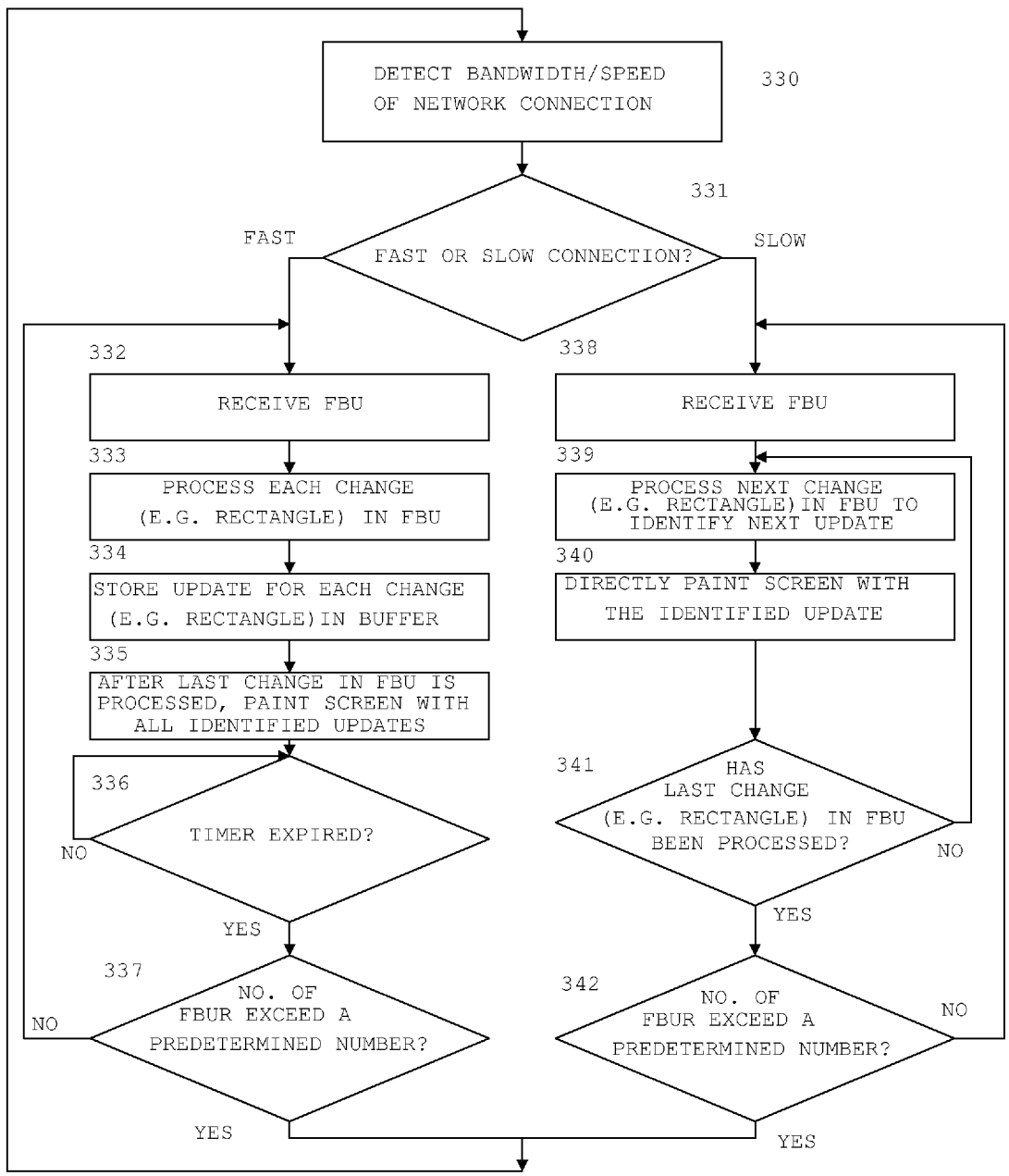

FIGS. 2-3 illustrate method embodiments performed by the VNC system to paint the screen of the client to reflect changes in the screen of the server. In the embodiment illustrated in FIG. 2, the bandwidth or speed of the network connection is detected at 221. For example, the client may detect the speed of the network connection between the client and the server. The detected network speed is used to dynamically adapt a screen painting algorithm or process, as illustrated at 222, used by the client to paint updates on the display of the client. The client processes the changes reflected in a FBU received from the server, and then sends an FBUR to the server to request another FBU from the server. The client counts the number of FBURs, and determines whether the number of FBURs exceed a predetermined number (e.g. 100 FBURs), as illustrated at 223. If the number of FBURs has not been exceeded, the process continues to screen paint the updates to the display of the client, as illustrated at 222. If the number of FBURs has been exceed, the process returns to 221 to re-detect the speed of the network connection, which is used to dynamically adjust the screen painting algorithm 222. If the detected network connection is determined to be "fast" as illustrated at 224, the client first processes all changes in an FBU and then paints the screen of the client to update the display with all changes reflected in the FBU, which reflects the changes in the display of the server. If the detected network connection is determined to be "slow" as illustrated at 225, the client processes each update and directly paints the screen with updates as each update is processed. A two state system (a first painting scheme for fast connections and a second painting scheme for slow connections). The present subject matter can be extended to provide multiple painting schemes for multiple network connections speeds.

In the embodiment illustrated in FIG. 3, the bandwidth or speed of the network connection is detected at 330. For example, the VNC client detects the available bandwidth of the underlying network connection with the VNC server, and remembers the state of the network (i.e. fast or slow network). At 331, the client determines whether the network connection is "fast" (e.g. a network connection having a speed greater than or equal to 512 kbps) or "slow" (e.g. a network connection having a speed less than 512 kbps).

For fast network connections, the client receives an FBU from the server as illustrated at 332, and then processes each change (e.g. rectangle) contained in the FBU as illustrated at 333. The client stores in a memory buffer the update for each processed change/rectangle, as illustrated at 334. After the last change in the FBU is processed, the client performs a paint screen operation to update the client's display with all identified updates, as illustrated at 335. These identified updates reflect the changes in the server's display screen, as identified by the server in the FBU sent by the server to the client. At 336, the client waits until a predetermined timer (e.g. an 80 millisecond timer) has expired before allowing the client to send another FBUR to the server. If the number of FBURs has not exceeded a predetermined number of FBURs (e.g. 100 FBURs) as illustrated at 337, the client sends another FBUR to the server, and as illustrated at 332 receives from the server another FBU sent in response to the FBUR. If the number of FBURs has exceeded a predetermined number of FBURs, the speed of the network connection is re-detected at 330.

For slow network connections, the client receives an FBU from the server as illustrated at 338. At 339, each change/rectangle in the FBU is processed to identify the next update, and the update is directly painted to the screen as illustrated at 340. If, as illustrated at 341, the FBU includes at least one unprocessed change/rectangle, then the process returns to 339 to process the next change. When the last change/rectangle in the FBU has been processed, then the process continues to 342 to determine whether the number of FBURs has exceeded a predetermined number. If the number of FBURs has not exceeded a predetermined number of FBURs, the client sends another FBUR to the server, and as illustrated at 338 receives from the server another FBU sent in response to the FBUR. If the number of FBURs has exceeded a predetermined number of FBURs, the speed of the network connection is re-detected at 330.

The embodiment illustrated in FIG. 3 processes and directly paints each rectangle in the FBU for slow network speeds, and processes all of the rectangles in the FBU before painting the screen for fast network speeds. Another embodiment reads and processes rectangles for a predetermined time (e.g. 80 milliseconds), then paints the screen based on the processed rectangles during the predetermined time, and then reads and processes additional rectangles for the next predetermined time followed by painting the screen based on the additional processed rectangles. The number of rectangles read during the predetermined time will change according to the underlying bandwidth of the network connection.

One of ordinary skill in the art will understand that, the illustrated processes and entities can be implemented using software, hardware, and combinations of software and hardware. The methods illustrated in this disclosure are not intended to be exclusive of other methods within the scope of the present subject matter. Those of ordinary skill in the art will understand, upon reading and comprehending this disclosure, other methods within the scope of the present subject matter. The above-identified embodiments, and portions of the illustrated embodiments, are not necessarily mutually exclusive. These embodiments, or portions thereof, can be combined. In various embodiments, the methods are implemented as a set of instructions contained on a computer-accessible medium capable of directing a processor to perform the respective method. The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

The above detailed description is intended to be illustrative, and not restrictive. Other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A method, comprising:
   sending a FrameBufferUpdateRequest (FBUR) from a virtual network computing (VNC) client through a network connection to a VNC server, wherein the FBUR requests the VNC server to identify changes in a display of the VNC server and the identified changes are less than all of the display of the VNC server;
   receiving a FrameBufferUpdate (FBU) from the VNC server at the VNC client, wherein the FBU identifies the changes in the display of the VNC server, and wherein the VNC client implements a screen painting algorithm capable of using more than one painting scheme for painting a display of the VNC client with the changes in the display of the VNC server identified by the FBU; and
   dynamically adapting the screen painting algorithm implemented by the VNC client to update the display of the VNC client based on a speed of the network connection, and updating the display of the VNC client using the screen painting algorithm, wherein dynamically updating the screen painting algorithm includes changing a painting scheme used by the screen painting algorithm for painting a display of the VNC client with the changes in the display of the VNC server identified by the FBU.

2. The method of claim 1, further comprising:
   counting a number of FBURs sent from the VNC client to the VNC server; and
   determining the speed of the network when a number of FBURs exceed a predetermined number of FBURs.

3. The method of claim 1, further comprising determining a bandwidth of the network connection, wherein dynamically adapting the screen painting algorithm includes dynamically adapting the screen painting algorithm based on the bandwidth of the network connection.

4. The method of claim 3, wherein dynamically adapting the screen painting algorithm includes, for a first network bandwidth, processing all changes in the FBU before painting the screen to update the display of the VNC client.

5. The method of claim 4, further comprising, after painting the screen to update the display, waiting for a predetermined timer to expire before sending another FBUR.

6. The method of claim 5, wherein the predetermined timer is on the order of 80 milliseconds.

7. The method of claim 3, wherein dynamically adapting the screen painting algorithm includes, for a second network bandwidth, processing each change in the FBU and painting the screen to update the display of the VNC client before processing the next change in the FBU.

8. The method of claim 1, further comprising detecting the speed of a network connection between the VNC client and a VNC server, wherein dynamically adapting the screen painting algorithm based on the speed of the network connection includes dynamically adapting the screen painting algorithm based on the detected speed of the network connection.

9. The method of claim 1, wherein updating the display of the VNC client using the screen painting algorithm includes updating the display at a rate approximately 12 or 13 times per second.

10. A method, comprising:
   detecting a speed of a network connection between a virtual network computing (VNC) client and a VNC server, wherein detecting the speed of the network connection includes determining a bandwidth of the network connection;
   sending a FrameBufferUpdateRequest (FBUR) from the VNC client to the VNC server, wherein the FBUR requests the VNC server to identify changes in a display of the VNC server and the identified changes are less than all of the display of the VNC server;
   receiving a FrameBufferUpdate (FBU) from the VNC server at the VNC client, wherein the FBU identifies the changes in the display of the VNC server; and
   for a first network bandwidth, processing all changes in the FBU before painting the screen to update the display of the VNC client; and for a second network bandwidth, processing each change in the FBU and painting the screen to update the display of the VNC client before processing the next change in the FBU.

11. The method of claim 10, further comprising:
   counting a number of FBURs sent from the VNC client to the VNC server; and
   re-detecting the speed of the network when a number of FBURs exceed a predetermined number.

12. The method of claim 10, wherein, for the first network bandwidth, processing all changes in the FBU before painting the screen to update the display of the VNC client includes:
   processing each change in the FBU and storing an update for each change in the buffer before proceeding to a next change in the FBU; and
   after processing a last change in the FUB, painting the screen to update the display of the VNC client with all identified updates.

13. The method of claim 12, wherein after painting the screen, waiting for a predetermined timer to expire before sending another FBUR from the VNC client to the VNC server.

14. A virtual network computing (VNC) client, comprising:
   at least one processor, and a display and memory operationally connected to the at least one processor;
   wherein the memory includes instructions which when operated on by the at least one processor perform a process to control a VNC protocol, wherein the process to control the VNC protocol includes:
   sending a FrameBufferUpdateRequest (FBUR) through a network connection to a VNC server, wherein the FBUR requests the VNC server to identify changes in a display of the VNC server and the identified changes are less than all of the display of the VNC server;
   receiving a FrameBufferUpdate (FBU) from the VNC server, wherein the FBU identifies the changes in the display of the VNC server, and wherein the VNC client is configured to use more than one painting scheme for painting the display of the VNC client with the changes in the display of the VNC server identified by the FBU; and
   dynamically changing the painting scheme used by the VNC client to update the display of the VNC client based on a speed of the network connection, and updating the display of the VNC client.

15. The VNC client of claim 14, wherein in the VNC protocol controlled by the process performed by the at least one processor operating on instructions in the memory, detecting the speed of the network connection includes determining a bandwidth of the network connection.

16. The VNC client of claim 15, wherein in the VNC protocol controlled by the process performed by the at least one processor operating on instructions in the memory, dynamically changing the painting scheme includes, for a first network bandwidth, changing the painting scheme to process all changes in the FBU before painting the screen to update the display of the VNC client.

17. The VNC client of claim 15, wherein in the VNC protocol controlled by the process performed by the at least one processor operating on instructions in the memory, dynamically changing the painting scheme includes, for a second network bandwidth, changing the painting scheme to process each change in the FBU and painting the screen to update the display of the VNC client before processing the next change in the FBU.

18. The VNC client of claim 15, wherein the VNC protocol controlled by the process performed by the at least one processor operating on instructions in the memory further comprises:
   counting a number of FBURs sent from the VNC client to the VNC server; and
   re-detecting the speed of the network when a number of FBURs exceed a predetermined number.

19. The VNC client of claim 14, wherein the process to control the VNC protocol includes detecting the speed of a network connection between a virtual network computing (VNC) client and a VNC server, wherein dynamically changing the painting scheme includes dynamically adapting the screen painting algorithm based on the detected speed of the network connection.

20. The VNC client of claim 14, wherein the process to control the VNC protocol includes updating the display at a rate approximately 12 or 13 times per second.

* * * * *

UNITED STATES PATENT AND TRADEMARK OFFICE
CERTIFICATE OF CORRECTION

PATENT NO. : 8,572,162 B2  Page 1 of 1
APPLICATION NO. : 12/325538
DATED : October 29, 2013
INVENTOR(S) : Gokaraju et al.

It is certified that error appears in the above-identified patent and that said Letters Patent is hereby corrected as shown below:

Title page, Item (56), under "U.S. Patent Documents", line 1, delete "Chun" and insert --Huang--, therefor Signed and Sealed this
Twenty-ninth Day of April, 2014

Michelle K. Lee
*Deputy Director of the United States Patent and Trademark Office*